C. LEON.
TRACK LAYING APPARATUS.
APPLICATION FILED JULY 5, 1911.
1,006,488.
Patented Oct. 24, 1911.
2 SHEETS—SHEET 1.
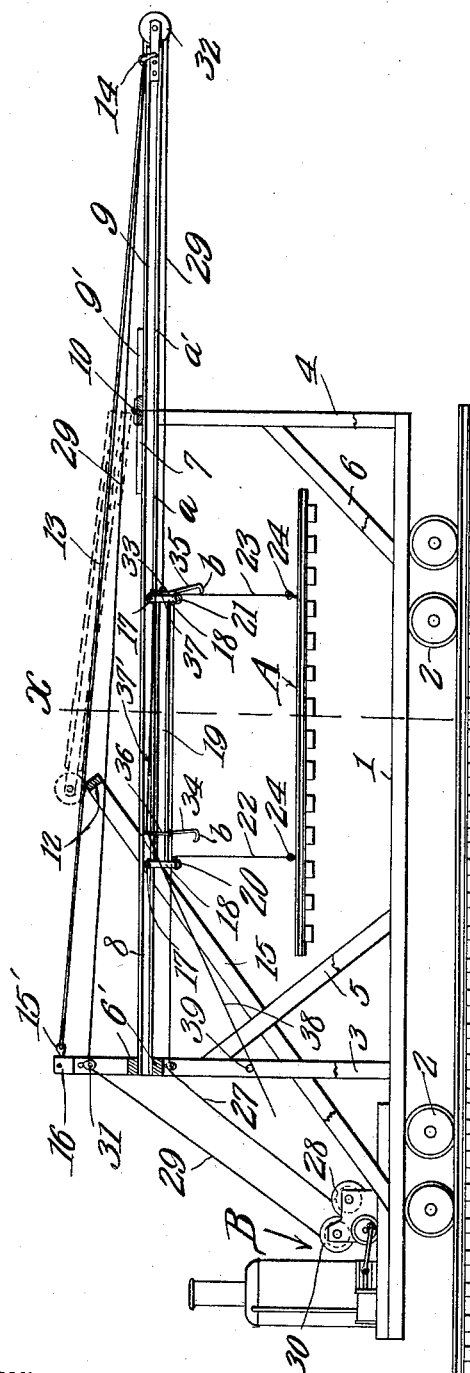
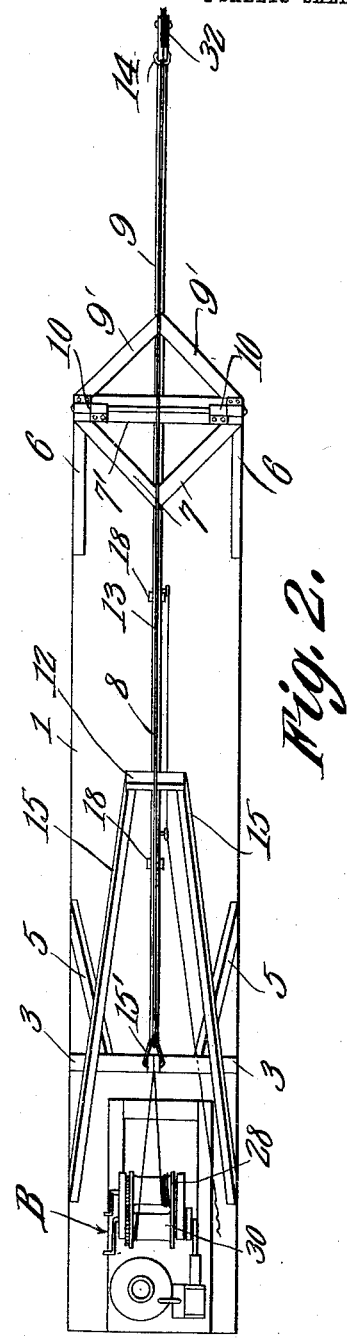
Witnesses
Creed Leon Inventor,
by C. A. Snow & Co.
Attorneys.

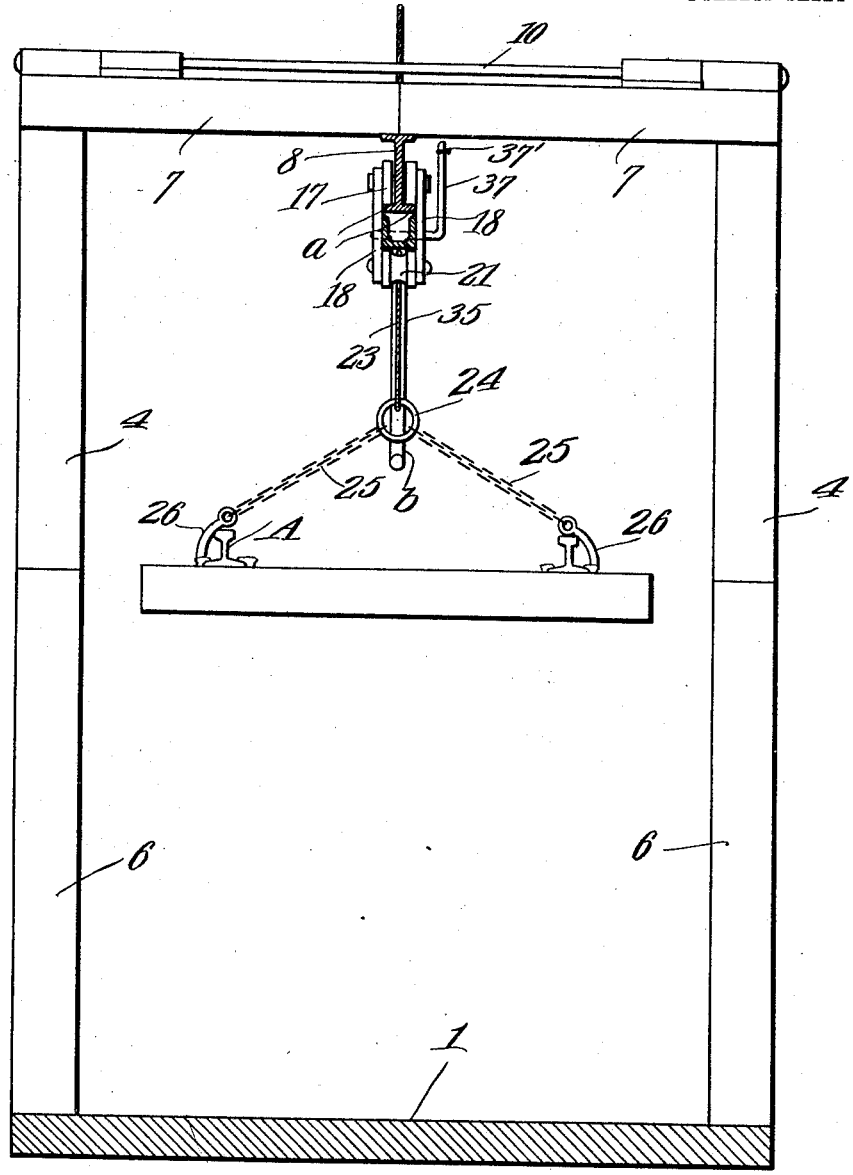

UNITED STATES PATENT OFFICE.

CREED LEON, OF NACOGDOCHES, TEXAS.

TRACK-LAYING APPARATUS.

1,006,488.  Specification of Letters Patent.  Patented Oct. 24, 1911.

Application filed July 5, 1911.  Serial No. 636,892.

*To all whom it may concern:*

Be it known that I, CREED LEON, a citizen of the United States, residing at Nacogdoches, in the county of Nacogdoches and State of Texas, have invented a new and useful Track-Laying Apparatus, of which the following is a specification.

This invention relates to improvements in a track laying apparatus, the primary object of the invention being the provision of a car or truck adapted to be either self-propelled or pulled upon the track, the said car or truck being provided with a power operated means for transferring sections of track from the ground onto the car or truck or from the car or truck upon the ground in the position that the sections of track are to assume to form a continuous track, the said apparatus being provided with a supporting frame carried by the car or truck and having mounted centrally and longitudinally thereof a guiding support for a carrier or frame combined with hingedly mounted sectional supports adapted to be connected to form an extension of the central longitudinal guide support of the apparatus when in use and when not in use to be folded back upon the upper portion of the framework.

A further object of this invention is the provision of a novel supporting frame mounted upon a portable car and provided with a central longitudinal guide carrying rail having an extension hingedly connected to the frame and adapted to be extended beyond the platform of the car or truck so that the object to be raised and lowered may be projected beyond the platform of the car and deposited or lifted from the ground at a point beyond the car and placed upon the platform of said car, a novel form of hoisting means being operably connected with the carrier or frame and to a hoisting drum controlled either by a steam, explosive or electric motor as may be desired.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a side elevation of the complete apparatus the extension being in the position it assumes when in use, while dotted lines show it as folded and out of use. Fig. 2 is a top plan view of the complete apparatus. Fig. 3 is a cross section taken on line X—X of Fig. 1 looking toward the rear of the machine.

Referring to the drawings, the numeral 1 designates the platform of a flat car, mounted upon the trucks 2, and provided with the rear inclined uprights 3 and forward perpendicular and parallel uprights 4, the braces 5 and 6 being connected to the respective uprights 3 and 4 to provide a framework to properly support the metal girder or I-beam 8, which is connected to the cross beam 6' of the inclined standards 3 and to the transverse bar 7' of the supports 4, the inclined braces 7 being connected to the upper end of the supports 4 and extending inwardly of the machine above the girder 8. This girder 8 as will be understood forms a track supporting means for the carriage as will presently appear.

The extension 9 which is a similarly shaped and constructed I-beam or girder, as 8, is provided upon its upper face with the two inclined braces or arms 9', whose ends abut the outer ends of the braces 7 where the extension 9 is hingedly connected by means of the rod and hinges 10, so that the said extension may assume the position as shown in Figs. 1 and 2 when in operation, and when folded or out of use will have its free ends resting upon the upper end of the inclined brace or support 12 having its inclined legs 15 connected to the platform 1 forwardly of the inclined supports 3 and also connected to said supports 3 to brace the same and assist in bracing the entire structure.

In order to properly support the extension 9 when extended and relieve the hinges 10, the guy rope 13 is connected to the yoke 14 at the extreme end of the extension 9 and to the eye bolt 15 of the apex 16 of the inclined supports 3, as clearly shown in Figs. 1 and 2 of the drawings.

Provided with the supporting anti-frictional wheels 17 and disposed to travel to engage the webs $a$ and $a'$ of the respective girders 8 and 9, are the depending arms 18, which carry the carriage 19 which as shown is adapted to be moved above the platform 1 between supports 4 upon the lateral rails $a$ and $a'$ and the centrally disposed longitudinal rails or girders 8 and 9 so that the said carriage may perform the desired function to either raise the rail section A upon the platform 1 or deposit it upon the ground beyond the front of the platform, or vice versa. In order to properly support the said rail section A the depending ends of the respective pairs of arms 18 have mounted therein the pulleys 20 and 21 respectively, through which are adapted to pass two ropes or cables 22 and 23, which are connected together beyond the pulley 20 to the single cable 27 operably connected upon the drum 28 of the hoisting apparatus B, the lower ends of the respective cables 22 and 23 being provided with the rings 24, each one of which is provided with the two chains 25 carrying at their terminals the hooks 26 for engagement with the rails of the rail section A, as clearly shown in Fig. 3 of the drawings. It will thus be seen that the hoisting device may be operated to simultaneously actuate both of the cables 22 and 23 to raise or lower the track section A and retain the same in such a position that it will be parallel with the underside of the girders 8 and 9 and the top of the platform 1, and so that when it is desired to lay the sections in continuity to form a continuous track, said sections will be projected beyond the end of the car upon the girder 9 and be deposited in a level position at the desired place, thus making it possible to lay a section of the track at a time, and when desired to remove a section at a time. It will thus be seen that the cable 27 may be used not only as a means for raising and lowering the rail sections A, but it may also be employed as what is termed a "haul in line" to haul the carriage inwardly from the section 9 upon the section 8 of the supporting track, but in order to haul the same outwardly, the cable 29 is employed it being operably connected to the hoisting drum 30 of the hoisting apparatus B and passes upwardly and over the pulley 31 connected at the upper end of the support 2 within the apex thereof and extends centrally and longitudinally of the machine and around the enlarged pulley or sheave 32 disposed in the extreme end of the section 9, the terminal of the said cable 29 being connected at 33 to the end of the carriage 19, thus providing a means whereby the drum 30 is operated to haul the carriage toward the girder or track 9 or providing what is termed a "haul out line."

It is often desired to release the strain upon the cables 22 and 23 when the carriage is hauled out or in and carries a rail section and in order to accomplish this, the two members 34 and 35 respectively, are pivoted to the underside of the carriage 19 as clearly shown in Figs. 1 and 3 and have their depending ends b disposed so as to engage the respective rings 24 thereby to relieve the strain upon the cables 22 and 23 which carry the weight of the rail sections, engaging said rings 24, and in order that said hooks may be released from the rings 24, or be caused to engage the same simultaneously, the upper ends 36 and 37 of the respective pivoted hooks, are connected by means of the cables 37', the cable 38 being connected to the upper end 36 of the hook and has its free end passing over the clamping device 39 mounted upon one of the standards or supports 3, thus providing a means for retaining the cable 38 in the desired position.

Although no means has been shown for operably connecting the hoisting device to propel the car or truck the same may be applied without departing from the spirit of the invention, it being clearly evident that the hoisting device may be used as a propelling power as well as operating means for the carriage 19.

From the foregoing description, it is evident that the supports 3 and 4, combined with the girder 8, provide a rigid framework that is carried by the platform 1, thus providing means for properly supporting the carriage 19 and the hoisting cables so that the rail section may be properly moved to and from the platform 1 and longitudinally thereof upon the section 9 of the girder 8, said section being so disposed as to be placed in longitudinal alinement therewith when desired, and to be folded backwardly upon the upper portion of the super-structure or frame when not in use, the same being supported by means of the inclined supports 12 and 13, thus taking the weight from the free end thereof directly upon the framework and at the same time holding it at such an incline that it may be readily moved from such position to the extended position as shown in Figs. 1 and 2.

What is claimed is:

1. The combination with a portable platform, of a framework carried thereby, an I-beam disposed longitudinally and centrally of the said platform in the framework, another I-beam hingedly connected to the framework and disposed to aline with and form a continuous beam with the first mentioned I-beam, a hoisting carriage disposed for movement upon said beams, and means mounted upon the platform for operating the hoisting carriage.

2. The combination with a portable platform, of a framework carried thereby, two I-beams one of them rigidly connected to said framework and the other hingedly connected to form a continuous beam with the stationary beam, a hoisting carriage disposed for travel upon said beams, a pair of flexible cables disposed upon said carriage and each provided with engaging devices at their lower ends, a hoisting apparatus mounted upon the platform, a single cable attached to both of said cables and to the hoisting apparatus, whereby said cables are operated simultaneously.

3. The combination with a portable platform, of a framework carried thereby, two I-beams one of them rigidly connected to said framework and the other hingedly connected to form a continuous beam with the stationary beam, a hoisting carriage disposed for travel upon said beams, a pair of flexible cables disposed upon said carriage and each provided with engaging devices at their lower ends, a hoisting apparatus mounted upon the platform, a single cable attached to both of said cables and to the hoisting apparatus, whereby said cables are operated simultaneously, said cables forming a hoisting and haul-in-line, and a haul-out-line operably connected to the hoisting apparatus and the carriage.

4. In an apparatus of this character, the combination with a portable car having a platform, a pair of inclined supports near the hoisting end thereof, and a pair of parallel supports connected to the extreme other end thereof, of an I-beam connected to the inclined and parallel supports parallel with and longitudinally central of the platform, the rear end of said I-beam terminating in line with the rear end of the platform, another beam hingedly connected to the parallel supports and adapted to aline when extended with the stationary I-beam to form a track therewith, a hoisting carriage mounted upon the lower flanges of the I-beams, means for moving said carriage along the I-beams, and means connected to the outer free end of the extension and the upper end of the inclined supports for assisting in holding the I-beam in extended position.

5. In an apparatus of this character, the combination with a portable car having a platform, a pair of inclined supports near the hoisting end thereof, and a pair of parallel supports connected to the extreme other end thereof, of an I-beam connected to the inclined and parallel supports parallel with and longitudinally central of the platform, the rear end of said I-beam terminating in line with the rear end of the platform, another I-beam hingedly connected to the parallel support and adapted to aline when extended with the stationary I-beam to form a track therewith, a hoisting carriage mounted upon the lower flanges of the I-beams, means for moving said carriage along the I-beams, means connected to the outer free end of the extension and the upper end of the inclined supports for assisting in holding the I-beam in extended position, and an inclined rest projecting above the stationary I-beam to receive the free end of the hinged I-beam when folded.

6. The combination with a longitudinally disposed sectional I-beam carriage guide and support, a carriage having two pairs of supporting arms, anti-frictional supporting rollers carried in the upper ends of said arms and engaging the respective lower flanges of the I-beams, a guide pulley mounted in the lower ends of each pair of arms, two cables passing over their respective pulleys, a ring carried at the terminal of each of said cables, a hoisting device, a cable connected to the hoisting device and to the other terminals of both of said cables for operating both cables and their respective rings in unison, and a pair of pivoted hooks connected to the carriage for simultaneous operation disposed to engage said rings and relieve said cables.

In testimony that I claim the foregoing as my own, I have hereto affixed my signature in the presence of two witnesses.

CREED LEON.

Witnesses:
  G. F. Partin,
  V. E. Middlebrook.

---

Copies of this patent may be obtained for five cents each, by addressing the "Commissioner of Patents, Washington, D. C."